April 21, 1964 G. A. MALEY ETAL 3,130,321

PULSE INPUT CONTROL CIRCUIT

Filed Nov. 3, 1959 5 Sheets-Sheet 1

FIG. I

INVENTORS
WILLIAM L. STAHL
GERALD A. MALEY

BY Geoffrey Knight
ATTORNEY

April 21, 1964 G. A. MALEY ETAL 3,130,321

PULSE INPUT CONTROL CIRCUIT

Filed Nov. 3, 1959 5 Sheets-Sheet 2

*INVENTORS*
WILLIAM L. STAHL
GERALD A. MALEY

BY Geoffrey Knight
*ATTORNEY*

PULSE INPUT CONTROL CIRCUIT

Filed Nov. 3, 1959 5 Sheets-Sheet 3

INVENTORS
WILLIAM L. STAHL
GERALD A. MALEY
BY Geoffrey Knight
ATTORNEY

INVENTORS
WILLIAM L. STAHL
GERALD A. MALEY
BY Geoffrey Knight
ATTORNEY

April 21, 1964 G. A. MALEY ETAL 3,130,321

PULSE INPUT CONTROL CIRCUIT

Filed Nov. 3, 1959 5 Sheets-Sheet 5

INVENTORS
WILLIAM L. STAHL
GERALD A. MALEY

BY Geoffrey Knight

ATTORNEY

United States Patent Office 3,130,321
Patented Apr. 21, 1964

3,130,321

PULSE INPUT CONTROL CIRCUIT

Gerald A. Maley and William L. Stahl, Poughkeepsie, N.Y., assignors to International Business Machines Corporation, New York, N.Y., a corporation of New York Filed Nov. 3, 1959, Ser. No. 850,660
6 Claims. (Cl. 307—88)

This invention relates to pulse circuits and more particularly to a magnetic core circuit for converting a single timed input pulse into a corresponding series of timed output pulses.

The broad concept of this invention has been applied to form a compact magnetic-core decimal adder-subtracter unit. This unit consists of a control circuit and a counter, the control circuit accepting a single timed pulse corresponding to the number to be added, or subtracted, and emitting a series of pulses to the counter, the number of these pulses likewise corresponding to the number to be added or subtracted.

Previous units for accomplishing this function have generally been of the relay and cam contact, or of the vacuum tube type, components which, compared to cores, are relatively large and bulky, and have relatively high power requirements. The circuit of this application has improved over these prior art circuits by using magnetic cores as the active elements. Magnetic cores require power only for shifting purposes, and, therefore, operate on far less power than the other components mentioned. This results in less heat dissipation in the circuit and in a higher operating efficiency. Cores also have the advantages of being small, long-lived, and relatively inexpensive, so that their use results in compact, reliable, low cost circuitry.

It is therefore, an object of this invention to provide a magnetic core counter driving circuit.

Another object of this invention is to provide a magnetic core circuit which is capable of sensing a number on a record, such as a punched card, or in a counter, and of adding or subtracting this number into an accumulating counter.

A more general object of this invention is to provide a magnetic core pulse converter circuit which is capable of accepting a single information representing timed pulse, such as that read from a punched card, and of transmitting this information as a corresponding information representing series of pulses.

Other objects of this invention are:

To provide a magnetic core arithmetic control circuit which is capable of adding either a number or the nine's complement of a number into a counter;

To provide a simple compact arithmetic unit with a minimum of interaction between stages so that stages may be easily added or subtracted as needed to yield a flexible calculating system;

To provide a relatively high speed arithmetic system which is at the same time capable of operating over a wide range of speeds;

To provide a calculator system using high reliability components and interchangeable units so as to allow low maintenance costs.

In accordance with these objects this invention utilizes as an essential element a ferrite magnetic core having two stable states which will hereafter be referred to as the control core. The stable states of the control core will be designated the "zero" and the "one" state respectively, and for the following discussion it will be assumed that the control core is ordinarily in its "zero" state. A driver is provided which periodically attempts to shift the control core to its "zero" state. As long as there is no input to the control core, these drive pulses cause no output. An input pulse, such as that generated when a hole is sensed in a punched card, or when a counter passes its index point, will be received by the control core at a time in a cycle of operation which corresponds to the digit sensed, and will shift the control core to its "one" state. The next drive pulse will find the control core in its "one" state and will shift it to zero causing an output pulse. This output pulse is stored in a capacitor, and is then fed back through a winding on the control core which is so wound that this feedback pulse restores the control core to its "one" state. The subsequent drive pulses will find the control core in its "one" state, and will drive it to zero, causing an output pulse to appear for each such drive pulse. At the end of the operating cycle, the control core is reset to zero in a way which does not cause an output.

It can be seen that the number of output pulses which the control core generates per cycle will depend on the time in the cycle when the input pulse appeared. If this series of output pulses is fed into a counter, the digit sensed will be added into this counter. An advantage of the invention is that, by a simple switching arrangement, subtraction can also be performed by this circuit by the well known process of adding into the counters the complement of the digit sensed.

The foregoing and other objects, features and advantages of the invention will be apparent from the following more particular description of preferred embodiments of the invention, as illustrated in the accompanying drawings.

In viewing these figures it should be noted that all magnetic cores used possess square hysteresis loops and are therefore capable of existing in either of two stable states. These states will be designated the "zero" and the "one" states respectively. A dot is placed on one terminal of each core winding to indicate upon which terminal of the winding a positive pulse should be impressed to drive the associated core to its "zero" state. If a negative pulse is impressed on a dot marked terminal, the associated core will be driven to its "one" state. While a particular combination of core states and polarities have been chosen for the following discussion, it is to be understood that other combinations are possible as long as they are consistent.

Figure 1:
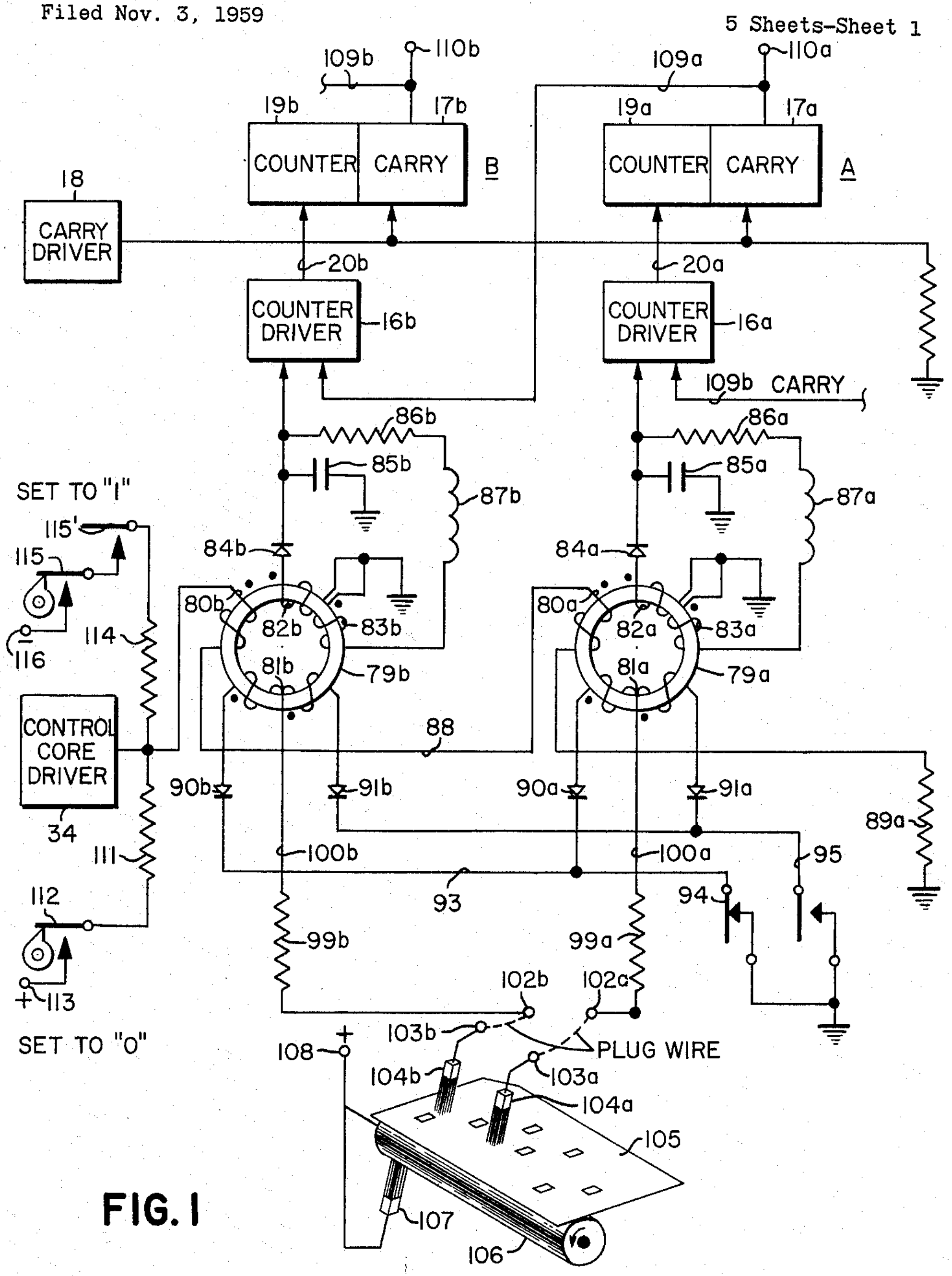
FIGURE 1 is a wiring and block diagram of one embodiment of my invention.

Looking now at FIGURE 1, which shows one illustrative embodiment of the invention it will be seen that two stages, or arithmetic units, A and B respectively, are shown. Since these two units are identical, except for their interacting elements, only one of them, the A unit, will be described, and it will be understood that, except where otherwise specified, what is said of the A unit will apply equally well to the B unit. When an element of the units is referred to by a reference numeral without an alphabetic subscript, it will be understood that all such elements in the machine are being referred to.

The A unit consists of a control core 79*a* having a drive winding 80*a*, a bifurcated input winding 81*a*, an output winding 82*a*, and a feedback winding 83*a*. The drive winding 80*a* is connected by a line 88 to a source of periodic positive drive pulses, the control core driver 34. Since the line 88 is connected to the dot-marked terminal of the winding 80*a*, the positive pulses from the driver 34 will tend to drive the core 79*a* to its "zero" state. The line 88 can also be connected through a resistor 111 and a cam contact 112 to a source of weak positive potential 113, and through a resistor 114, relay contact 115' and a cam contact 115 to a source of negative potential 116, the cam contacts 112 and 115 and the relay contact 115' being operated through the control circuits of the machine. The function of these two circuits will be described in the sections on process of addition and on process of subtraction, respectively.

The bifurcated input winding 81*a* makes possible the placing of either a zero or a one in the control core 79*a*. The opposite ends of this winding are connected through respective diodes 90*a* and 91*a* to contacts 94 and 95. These contacts are operated by relay coils (not shown), the operation being in a conventional manner through the control circuits of the machine. When the machine is in an adding operation, the contact 94 is closed connecting the left end of the winding 81*a* to ground. During this operation, the contact 95 remains open. When the machine is in a subtracting operation, the contact 95 is closed connecting the right end of the coil 81*a* to ground. During this operation, the contact 94 is open.

The common line 100*a* to the mid-point of the bifurcated winding 81*a* is connected through resistor 99*a* to plug hub 102. This hub may be connected by a plug wire to another hub leading to the desired data input means. In FIGURE 1, input is by way of a punched card 105 such as that shown in FIG. 8 and described later in this section. The plug wire is therefore connected from the hub 102*a* to a brush hub such as 103*a* which is internally connected by a wire to a brush 104*a*. The card 105 passes in a way to be described later between the brush 104*a* and the contact roll 106 which is connected by a common brush 107 to a positive terminal 108.

Figure 2:
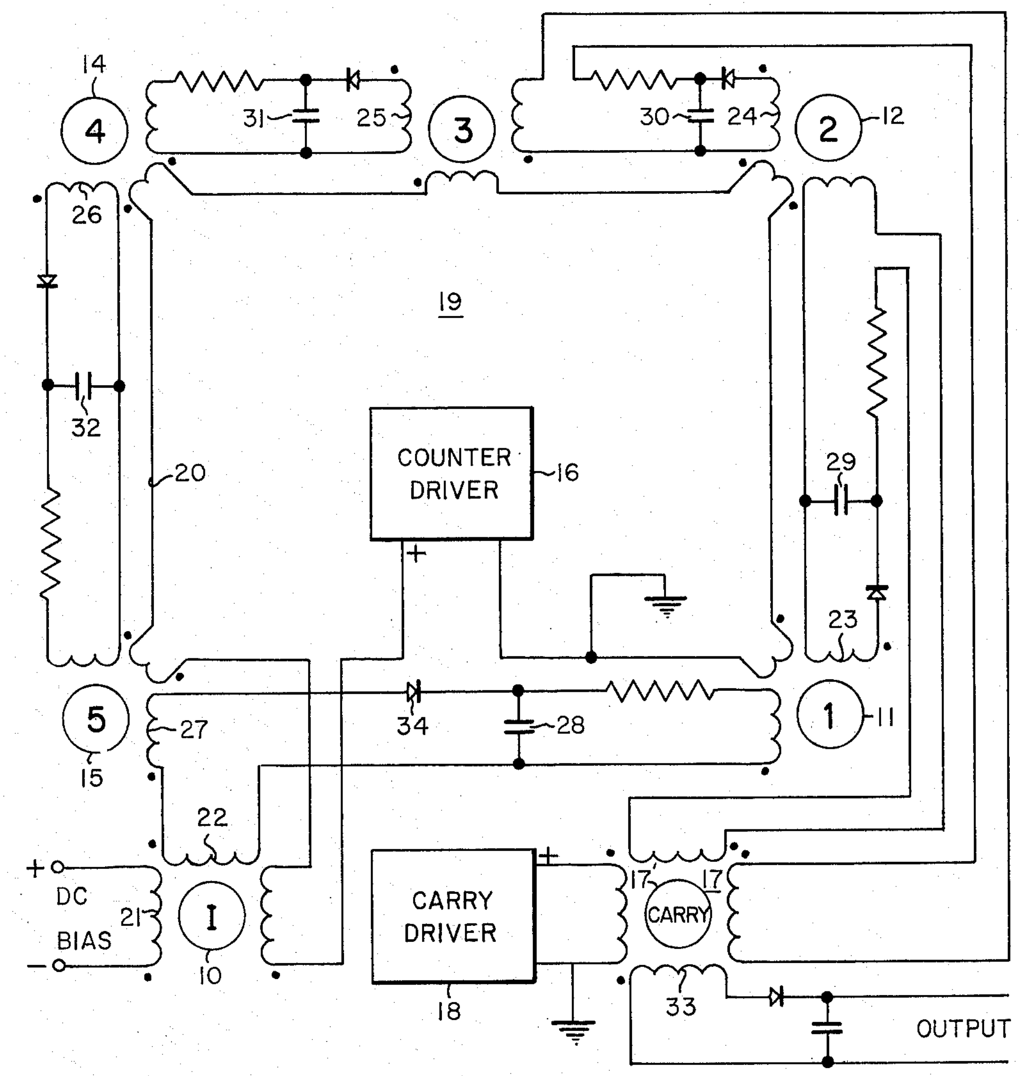
FIGURE 2 is a wiring diagram of a counter and carry circuit suitable for use with the embodiment shown in FIG. 1.

The dot marked terminal of the output winding 82*a* feeds positive output pulses through a rectifying diode 84*a* to charge the capacitor 85*a*. The subsequent discharge of this capacitor is fed to two parallel connected load circuits. The first of these load circuits consists of the counter driver 16*a* which is triggered by the positive output signal from the capacitor 85*a* to emit a drive signal to the decimal counter 19*a*. Counter 19*a* may be selected from any of a variety of pulse responsive decimal counters, one of which is shown in FIG. 2 and described in a later section. Counter 19*a* has a carry unit 17*a* which receives one drive pulse from the counter 19*a* for every ten drive pulses into the counter 19*a*. A carry driver 18 emits positive pulses to the carry unit 17*a* at suitable times in the cycle causing an output from that unit when it is triggered. This output is fed through the line 109*a* to trigger the counter driver 16*b* of the next higher order unit. The carry output line of the highest order unit 109*b*, for the two unit system shown in FIG. 1, is connected to a carry input terminal on the counter driver, 16*a* in FIG. 1, of the lowest order digit, to give what is commonly called an "end-around carry." The output circuit of the carry unit 17*a* also has a terminal 110*a* the function of which will be explained in connection with reading out from the counters 19.

The other parallel connected load circuit of output winding 82*a* consists of the resistor 86*a*, the coil 87*a*, and the feedback winding 83*a* on the control core 79*a*. The winding 83*a* is wound so that the positive pulse from the discharging capacitor 85*a* will be fed into its unmarked terminal causing the control core 79*a* to be flipped to its "one" state.

Before going into a detailed description of the operations of this circuit, it would be helpful to have first a more detailed description of the driver circuits shown as blocks 16, 18 and 34 in FIGS. 1 and 2, and then to look at the machine timing.

*Drivers*

Figures 3, 4:
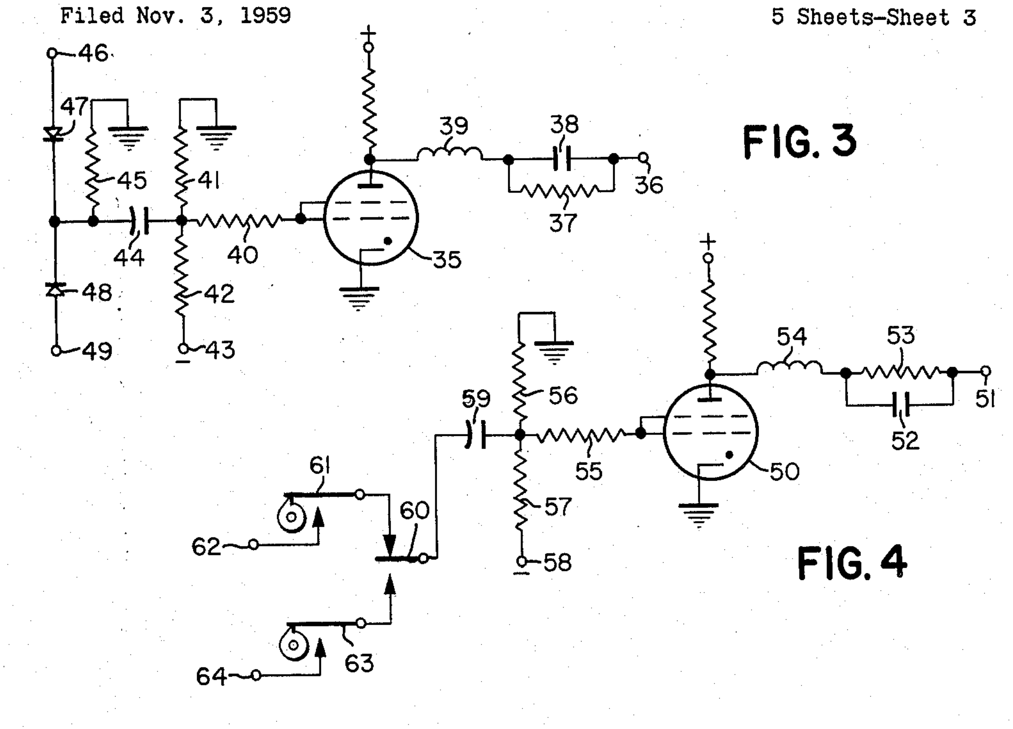
FIGURES 3 and 4 are, respectively, detailed wiring diagrams of a counter driver circuit and of a driver circuit suitable for use either as a carry driver or as a control core driver, these circuits appearing in block form in FIGURES 1 and 2.

Two types of self-extinguishing thyratron circuits are used as drivers in the chosen embodiment. The first, shown in FIG. 3, is used to drive the counters and is shown in FIGS. 1 and 2 as block 16. The second, shown in FIG. 4, is used to drive the carry cores and the control cores and is shown as blocks 18 and 34 respectively in FIGS. 1 and 2.

The counter drive circuit shown in FIG. 3 has a thyratron 35 which is normally held cut-off by the negative bias applied to terminal 43. It is fired by a positive input to either terminal 46 or 49, one coming from the control core and the other coming from the carry output of the preceding stage. The firing of the thyratron 35 results in a large potential drop at its plate which allows the capacitor 38 to discharge giving a current pulse through the thyratron 35 to ground and back through the counter drive line 20 to terminal 36. The coil 39 limits the current build up in the thyratron 35 and extends the pulse width. The self-extinguishing property of this circuit comes from the fact that the effective plate voltage drops too low to sustain ionization. When the thyratron 35 cuts off, the capacitor 38 recharges to its original potential.

The driver circuit in FIG. 4 operates in the same manner as that in FIG. 3 and differs only in that it has a single input. It will later be seen that the timing of input pulses to this driver varies with the operation being performed by the machine. A transfer contact 60 is therefore provided which, on the activation of its relay (not shown) will transfer the input to the driver from the control of cam contact 61 and its associated positive potential source 62 to the control of cam contact 63 and its associated positive potential source 64.

*Machine Timing*

Figure 8:
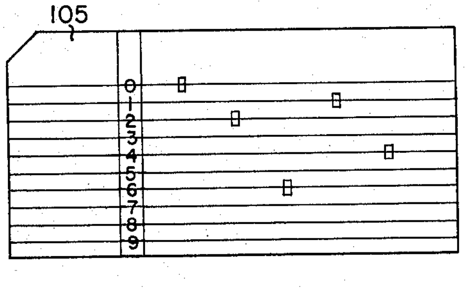
FIGURE 8 is a diagram of a punched card such as might be used to transmit information to the circuit shown in FIGURE 1.

This section on machine timing will be particularly concerned with the relationsihip between the sensing of information on the cards 105 and the timing of machine operations. Referring to FIG. 8, it is seen that each card 105 has ten numerical information bearing rows, one for each digit, with the row for the nine digit being positioned near the bottom or nine edge of the card 105, and with the rows for the other digits being stacked in descending order above it. Each card also has eighty information bearing columns, one of which is shown in detail in FIG. 8.

Figure 9:
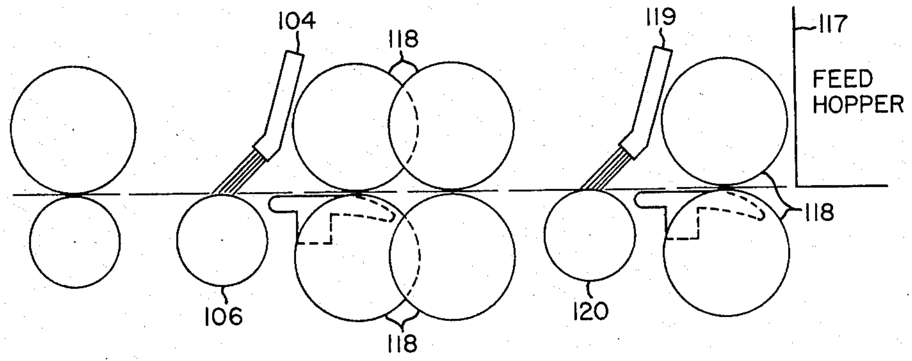
FIGURE 9 is a schematic diagram of a possible feed path for the punched card shown in FIGURE 8.

Referring to FIG. 9, the cards 105 are fed from the hopper 117 nine-edge-first and are carried by the rollers 118 past the special reading brushes 119 and the reading brushes 104. There are eighty brushes 119 and eighty brushes 104, one for each column of the card. As the cards 105 are fed under the reading brushes 104, the nine row will pass first. The time when the nine row is under the reading brushes 104 will hereinafter be referred to as "nine time." Likewise, the time in the cycle when the eight row in the cord 105 is under the brushes 104 will be referred to as "eight time," the time when the seven row is under the brushes 104, as "seven time," etc.

Figure 5:
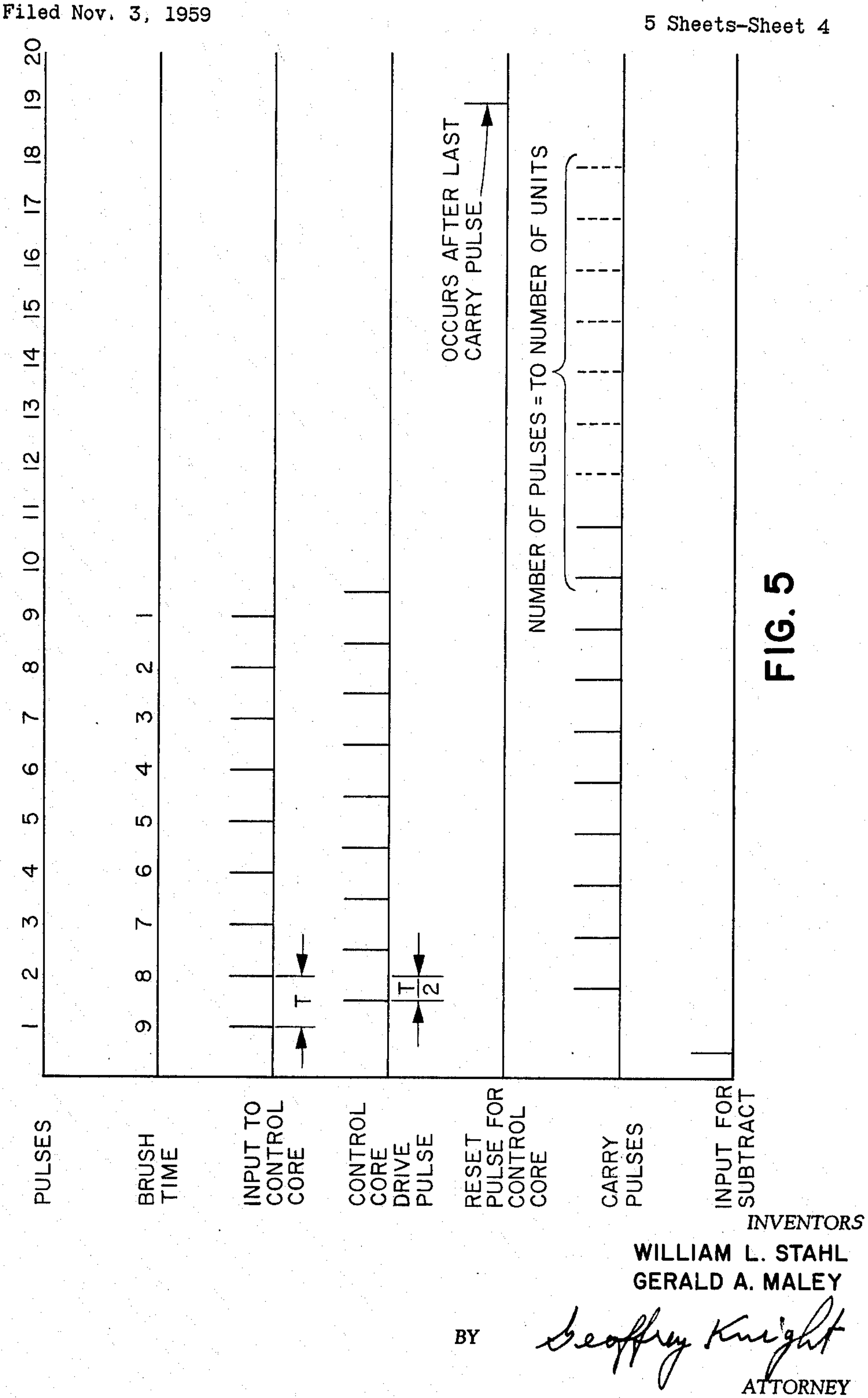
FIGURE 5 is a pulse timing diagram of the addition and subtraction cycles.

FIG. 5 is a timing chart which shows the brush times, and the relationship of the various machine pulses to these times. This chart is intended to show only the relative time of occurrence of the various pulses, the lines shown in no way representing the wave-shape of the pulses involved.

*Process of Addition*

The first process to be considered in detail is that of addition. As mentioned before, when addition is to be performed, the control circuits of the machine operate relays to close contact 94 and to open contact 95.

The process of addition can best be understood by reference to a specific example. Therefore, for the following discussion, it will be assumed that (1) hub 102*a* is connected to hub 103*a* by a plug-wire; (2) hub 102*b* is connected to hub 103*b* by a plug-wire; (3) the control cores 79 and the carry units 17 are initially in their "zero" or untriggered states; (4) the counter 19*a* has a nine stored in it and counter 19*b* has a one stored in it so that a nineteen is initially stored in the counters 19; and (5) the card column under the brush 104*a* has an eight punched in it while the card column under brush 104*b* has a one punched in; that is to say, eighteen is to be added to the nineteen standing in the counters 19.

The punched card 105 is fed over rollers 106 nine edge first, so that the brushes 104 are successively positioned over the nine row, the eight row, etc. at nine time, eight time, etc. respectively. At half-after each of the brush times the core driver 34 is fired emitting a positive pulse which travels through line 88 and attempts to drive all of the control cores 79 to zero.

For the illustrative example chosen, the brushes 104 will not sense a hole in the card 105 at nine time and the control cores 79 will remain in their "zero" states. The first half-after-brush time pulse from the control core driver 34 will therefore find all the control cores 79 in their "zero" state and will have no switching effect on them.

As the brushes 104 pass over the eight row in the card 105, the brush 104*a* will sense a hole allowing it to make contact with the roller 106 to complete a circuit from the positive terminal 108 through the common brush 107, the roller 106, and the brush 104*a*, terminal 103*a*, the plug-wire to terminal 102*a*, and the line 100*a* to the common terminal of bifurcated winding 81*a*. The fork of this winding leading to diode 91*a* and contact 95 is open circuited, leaving the left fork leading through diode 90*a* and contact 94 as the only available path to ground. The positive input pulse is therefore caused to pass into an unmarked terminal of a core winding and causes the core 79*a* to be flipped to its "one" state. The output on line 82*a* which this switching of the control core 79*a* causes is blocked by the diode 84*a*.

The next half-after-brush-time pulse from driver 34 still finds control core 79*b* in its "zero" state, and has no switching effect on it, but it now finds the control core 79*a* in its "one" state and flips it to zero. This causes a positive ouput pulse from the dot marked terminal of winding 82*a* which passes through the diode 84*a* to charge the capacitor 85*a*. The subsequent discharge of the capacitor 85*a* causes a positive pulse to: (1) pass through the resistor 86*a*, the coil 87*a*, and into the unmarked terminal of feedback winding 82*a* to restore control core 79*a* to its "one" state; and (2) to trigger the counter driver 16*a* in a way already explained. The triggering of driver 16*a* will cause a pulse to be emitted to the counter 19*a* to step this counter one position. Since, in the illustrative example, the counter 19*a* originally contained a nine, it is stepped to zero, and a pulse is emitted to trigger its carry unit 17*a*.

Consulting FIG. 5, it can be seen that the carry driver 18 is fired after each firing of the control core driver 34 and before the next "brush time." The carry core driver 18 therefore fires before seven time to restore the carry unit 17*a* to its untriggered state. This causes a positive output pulse along the line 109*a* which triggers the counter driver 16*b* causing the counter 19*b* to be stepped one position. Since counter 19*b* was originally storing a one, it will be storing a two after being stepped.

Subsequent half-after-brush-time pulses from driver 34 will find the control core 79*a* in its "one" state and the control core 79*b* in its "zero" state, this condition existing until a hole is sensed in the card 105. As has been seen counter 19*a* is stepped for each such pulse while counter 19*b* is unaffected. This means that at one time the counter 19*a* will have a six stored in it and the counter 19*b* two. At one time the brush 104*b* senses a hole in the card 105 and a circuit is completed, as described before so as to allow a positive pulse from source 108 to pass into the unmarked terminal on the left fork of winding 81*b* to flip the control core 79*b* to its "one" state. The ninth pulse from the carry core driver 34 will therefore find both control cores 79 in their "one" states and will flip them to zero causing outputs which result in the counters 19 each being stepped one position. The counter 19*a* will now have a seven stored in it and the counter 19*b*, a three.

Looking again at FIG. 5, it is seen that this ninth pulse is the last pulse in the cycle from the control core driver 34 and that the carry core driver 18 is now fired a number of times equal to the number of counter units. This is done to clear the carry units and to propagate carry digits with an end around carry after the last digit. The necessity for this operation will be illustrated by the subtraction example in the next section. It should be noted here that the end around carry after the last digit is a feature designed specifically for the subtract operation and that when it occurs on an add operation, it indicates that the capacity of the counters 19 has been exceeded. Therefore, on an add operation, an output pulse from carry unit 17*b* may be used to activate a trigger (not shown) which in turn stops the machine and lights an indicator lamp.

It can now be seen that the number of pulses from the control core driver 34 which the control cores 79 gate through to their respective counter drivers 16 is equal to the number sensed in the card 105 by the associated brush 104, and therefore, that the number added into the counter 19 is equal to the number so sensed. In the illustrative example a nineteen was originally stored in the counters 19, eighteen was sensed in the card 105, and the number stored in the counter at the end of the operation was the sum of these two numbers, thirty-seven.

At the end of a card cycle the cam contact 112 is closed allowing a positive pulse to flow through the line 88. This pulse is of relatively low amplitude and relatively long duration so that it reflips the control cores 79 slowly to zero. This results in low energy output pulses from the control cores 79 which are of sufficient duration to allow some of the charge on the capacitors 85 to leak off. The capacitors 85 are therefore left with insufficient energy to either trigger the counter drivers 16 or to return the control cores 79 to their "one" states and the control cores are therefore left reset and ready for the next cycle.

*Process of Subtraction*

Subtraction is accomplished in this device by a process of complementing and adding. For example, suppose it is desired to subtract ten from eleven. First the "nines complement" of the subtrahend ten is formed by taking the difference between each of its digits and nine. Therefore, $$\begin{array}{r} 99 \\ -10 \\ \hline \end{array}$$

$$\text{Nines complement of } 10 = 89$$

If this number is added to the minuend eleven, $$\begin{array}{r} 11 \\ +89 \\ \hline 100 \end{array}$$

the result is one less than the correct answer and there is a one to carry from the highest order position. If this one is carried around and added to the lowest order position the correct answer will be obtained. It has been shown that where, as in the above illustrative example, the result of a subtraction is positive, the sum of the minuend and the nines complement of the subtrahend will always be one less than the correct result and there will always be a one to carry from the highest order position. Therefore, if, in this class of problems, there is an end-around carry from the highest order position the correct answer will always be obtained.

A somewhat different situation exists where the result of the subtraction is negative as if eleven is to be subtracted from ten. Here complementing and adding gives $$\begin{array}{r} 10 \\ +88 \\ \hline 98 \end{array}$$

an answer which, as can be seen, is the nines complement of the correct answer.

The circuit shown in FIG. 1 performs both the complementing and adding in one operation. The process of subtraction will be described with reference to a specific example, the example being one which will give a positive result. The modifications necessary for handling negative results will then be mentioned.

For the illustrative example assume that (1) control cores 79 and carry units 17 are all initially cleared, (2) hub 102*a* is plug-wired to hub 103*a* and hub 102*b* is plug-wired to hub 103*b*, (3) counters 19*a* and 19*b* each have a one stored in them, and (4) the columns in card 105 sensed by brushes 104*a* and 104*b* have a zero and a one punched in them, respectively, so that the problem is to subtract ten from eleven.

For the subtract operation, relays (not shown) are activated to close contacts 95 and 115′ while opening contact 94. The control signal to activate these relays may, for example, be derived by designating a certain position of the card as the control position, and using a signal derived from the associated special reading brush 119 sensing a hole in that position for the control function.

Before nine time in the cycle the cam contact 115 is closed and, since contact 115′ is closed, the negative potential source 116 is momentarily connected directly to the line 88 sending a pulse into this line to set all the control cores 79 to their "one" state. The blocking diodes 84 will prevent this operation from causing any output from the control cores 79.

The card 105 is fed, as for the add operation, so that at nine time the brushes 104 are over the nine row in the card 105. In the illustrative example, no holes are punched in this row and the control cores 79 are left in their "one" states. The first half-after-brush-time pulse from the control core driver 34 flips both control cores 79 to their "zero" states causing outputs which will cause the counters 19 to each be stepped one position and the control cores 79 to be restored to their "one" states in the manner already described.

This process will continue until a hole is sensed in the card 105, or, in the present example, until one time in the cycle. Consulting FIG. 5 it is seen that by one time the control core driver 34 has fired eight times, meaning that each of the counters 19 has in this example been stepped eight positions. At one time in the cycle, the counters are therefore each storing a nine.

At one time the brush 104*b* senses a hole in card 105 and makes contact with roller 106 to momentarily complete a circuit from the source of positive potential 108, through the brush 107, roller 106, brush 104*b*, terminal 103*b*, plug-wire to terminal 102*b* and the line 100*b* to the common terminal of bifurcated winding 81*b*. Since the left fork of this winding is open-circuited at the contact 94, the positive pulse will pass into the dot-marked terminal of the right fork, and through the diode 91*b* and contact 95 to ground causing control core 79*b* to be flipped to its "zero" state. This drive-to-zero pulse, like that from cam contact 112, is of low energy and long duration so that the resulting charge on the capacitor 85*b* does not have sufficient energy to either trigger counter driver 16*b* or to restore control core 79*b* to its "one" state.

The ninth half-after-brush-time pulse now finds control core 79*b* in its "zero" state and has no effect on it, but control core 79*a*, still being in its "one" state, is flipped, causing counter 19*a* to be stepped one position. The last stepping of counter 19*a* advances it to zero causing its carry unit 17*a* to be triggered.

The carry core driver 18 is now fired a number of times equal to the number of counter units (reference FIG. 5) or twice for the circuit of FIG. 1. The first of these carry pulses restores carry unit 17*a* causing an output along line 109*a* triggering counter driver 16*b* to advance counter 19*b* from nine to zero. This will cause carry unit 17*b* to be triggered, and the second pulse from the carry driver 18 is now required to restore this unit. The restoring of carry unit 17*b* to its untriggered state causes an output along line 109*b* which triggers counter driver 16*a* to advance counter 19*a* from zero to one.

It can now be seen that the number of pulses from control core driver 34 which the control cores 79 gate through to the counters 19 is equal to the nines complement of the number sensed in the associated column of card 105. The complementing and adding are therefore both performed in one operation and the end-around carry from the highest order position is secured by connecting the output from the carry unit of the highest order position to the input of the counter for the lowest order position and firing the carry driver 18 a sufficient number of times to assure that all the carry units 17 are restored.

At the end of the cycle, the cam contact 112 is closed to restore the control cores 79 to their zero state in a manner already described.

The discussion and example so far have assumed that the result of the subtraction would be a positive number. Negative quantities may be handled by such conventional methods as by, on read-out, sensing the output of the highest order counter position for nines and, where a nine is sensed, complementing the read-out quantity.

*Process of Read-Out*

All of the counters are read out of simultaneously.

Figure 7:
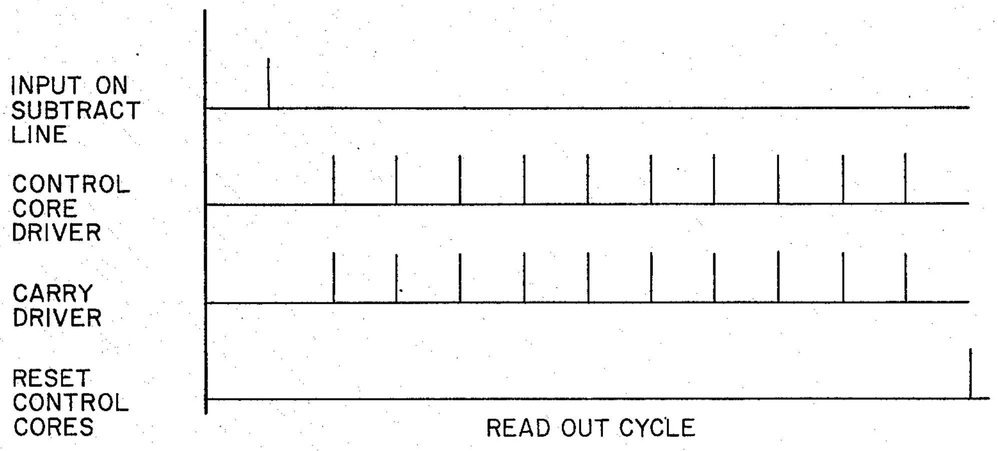
FIGURE 7 is a pulse timing diagram of the read-out cycle.

For read-out, as for subtract, a relay is activated to close contact 115′ allowing the negative potential source 116 to be connected to the line 88 when the cam contact 115 is closed at the beginning of the cycle to place one in all control cores 79 in a manner already discussed. Referring to FIG. 7, where the timing for all pulses in the read-out cycle are diagrammatically shown, it is seen that the control core driver 34 and the carry driver 18 are now fired simultaneously ten times. Considering only unit A and noting previous explanations, it can be seen that each firing of the control core driver 34 triggers the counter driver 16*a* and therefore causes the counter 19*a* to be stepped one position. Ten such firings roll the counter 19*a*. The carry unit 17*a* of the counter 19*a* is triggered at a time in the cycle which is a function of the number to be read out, and the firing of the carry driver 18 causes an output pulse at the terminal 110*a*. An output also appears along the lines 109*a* leading to the counter driver 16*b* for the next higher order counter 19*b*, but this pulse arrives at that counter driver 16*b* at the same time as the pulse from the control core 79*b* and these pulses are seen by the counter 19*b* as just one pulse. This pulse therefore does not advance the counter 19*b* of the next-higher-order position as it would otherwise do. The output from terminal 110*a* is then time-sampled to indicate the digit to be read out.

*Time Sampling*

Figure 6:
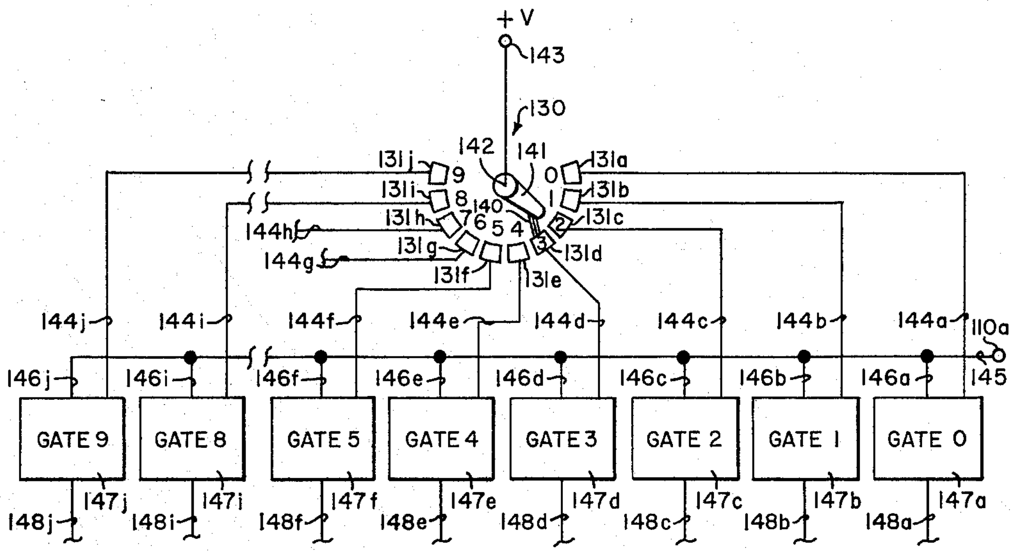
FIGURE 6 is a diagram of the commutator and gating circuitry used to time select the output from the counters shown in FIG. 2.

FIG. 6 shows the circuit which is used to time sample the output from a single carry unit such as carry unit 17*a*.

It consists of a commutator 130 and ten gates 147*a*–147*j*. The commutator has a conducting arm 141 which rotates, in a counter clockwise manner about the hub

142. One end of the arm 141 is connected to a source of positive potential 143 and the other end has a brush 140 which successively passes across contacts 131*a*–131*j*. These contacts are each connected by a line 144 to one of the inputs of a corresponding gate 147. The other input to each of the gates comes from the terminal 110*a* through the lines 145 and 146.

The rotation of the arm 141 is so timed that at the time of the first firing of the drivers 18 and 34 its brush 140 is touching the nine contact 131*j*, at the time of the second firing, its brush 140 is touching the eight contact 131*i*, and so on. When the brush 140 touches a contact 131 a circuit is completed from the source of positive potential 143, through the arm 141, the brush 140, the contact 131, and the line 144 to condition the corresponding gate 147.

At a time in the cycle corresponding to the number to be read out a pulse from terminal 110 passes along the line 145 and the lines 146 to trigger the conditioned gate 147. An output then occurs on the line 148 corresponding to the conditioned gate 147.

For example, if the counter 19*a* was storing a seven as it is at the end of the addition problem, an output to terminal 110*a* would occur at the third firing of the drivers 18 and 34. As has previously been stated, the brush 140 would at that time be resting on the seven contact 131*h* and the seven gate 147*h* would therefore be conditioned. An output on line 148*h* would indicate that a seven had been read out.

At the end of a read-out cycle, the cam contact 112 is closed emitting a pulse to reset the control cores 79 to zero in a manner already described.

*Counters*

FIG. 2 shows a counter 19 and carry circuit 17 which might be used with this invention. The counter is a magnetic core counter of the folded ring type, and possesses certain advantages of speed and compactness over other counters which might have been used. However, it will be seen that any pulse responsive decimal counter would serve with the embodiment shown, and with a different type of input, even the limitation of a decimal counter could be eliminated.

The counter shown in FIG. 2 uses the following five-bit code:

| Digit Values | State of Cores | | | | |
|---|---|---|---|---|---|
| | 1 | 2 | 3 | 4 | 5 |
| Home 0 | 1 | 1 | 0 | 0 | 0 |
| 1 | 1 | 1 | 1 | 0 | 0 |
| 2 | 1 | 1 | 1 | 1 | 0 |
| 3 | 1 | 1 | 1 | 1 | 1 |
| 4 | 0 | 1 | 1 | 1 | 1 |
| 5 | 0 | 0 | 1 | 1 | 1 |
| 6 | 0 | 0 | 0 | 1 | 1 |
| 7 | 0 | 0 | 0 | 0 | 1 |
| 8 | 0 | 0 | 0 | 0 | 0 |
| 9 | 1 | 0 | 0 | 0 | 0 |

Assuming the counter to be initially set to its zero, or home, position, cores 10, 11 and 12 will be in the "one" state with all other cores in the "zero" state. Core 10 is an inhibit core which is normally held in the "one" state by the D.C. bias applied to its winding 21.

If a drive pulse is now emitted by driver 16, it will drive all cores connected to drive line 20 to their "zero" state. Since cores 13, 14 and 15 are already in the "zero" state they will be unaffected; however, cores, 10, 11 and 12 will be flipped from the "one" to the "zero" state causing outputs from windings 22, 23, and 24 respectively. These outputs will charge capacitors 28, 29 and 30 respectively, and the subsequent discharge of these capacitors will flip cores 11, 12 and 13 to the "one" state. The inhibit core 10 will be returned slowly to the "one" state by the D.C. bias on winding 21. This slow return to one will cause a slight output from winding 22, but this low energy output is blocked by the diode 34 and does not affect the cores 11 and 15.

The counter is now set for a coded digit one. Subsequent drive pulses will leave the counter with one more core in the "one" state, the third pulse leaving cores 10 through 15 in the "one" state. The fourth drive pulse will drive cores 10 through 15 to zero and will cause outputs from windings 22 through 27 respectively. The outputs from windings 23 through 26 will charge their respective capacitors and the subsequent discharge of these capacitors will flip cores 12 through 15 to the "one" state. The output from windings 22 and 27 will be essentially equal and of opposite polarity. They will therefore cancel in the series winding, leaving capacitor 28 uncharged, and core 11 in the "zero" state.

It can now be seen that if core 15 is initially in the "zero" state, core 10 will serve to place a one in core 11; whereas if core 15 is initially in the "one" state, core 10 will be inhibited from placing a one in core 11. The counter therefore has four transfer stages and an inversion stage giving rise to the code previously shown.

The carry circuitry with this type of counter is determined almost exclusively by the code being used. Referring to the code previously shown, it will be seen that the only time there is an output from the one core, core 11, and no output from the two core, core 12, is on the tenth pulse. A one is therefore placed in the carry core 17′ from an $A\overline{B}$ circuit where A is core 11 and B is core 12. Firing carry driver 18 drives core 17′ to zero causing an output pulse to be emitted from the winding 33.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a cyclicly operating device for converting a single timed pulse into a corresponding series of pulses, a magnetic core adapted to remain stable in either of two stable states and to be switched from one of said states to the other by electromagnetic pulses, means for applying a series of drive pulses to said core during each cycle tending to switch said core rapidly to one of said stable states, restoring means for setting said core to said one stable state prior to the start of a cycle, switching means for applying the timed input pulse to said core between a selected pair of said drive pulses for switching said core to said other stable state, output pulse means effectively responsive to the switching of said core by said drive pulses, and storage means responsive to each effective output pulse to transmit a delayed set pulse to said core to switch it to said other stable state, said restoring means restoring said core to said one stable state at the end of a cycle, whereby a number of effective output pulses is delivered by said core equal to the number of drive pulses between said timed input pulse and the restoring of said core at the end of the cycle.

2. In the circuit of claim 1, a counter responsive to each effective output pulse from said core to be stepped one digit position, whereby a digit represented by said single timed input pulse will be added into said counter by said corresponding series of pulses.

3. In a cyclicly operating device for converting a single timed pulse into a corresponding series of pulses, a magnetic core adapted to remain stable in either of two stable states and to be switched from one of said states to the other by electromagnetic pulses, means to apply a series of drive pulses to said core during each cycle tending to switch said core rapidly to one of said stable states, means operable at the beginning of a cycle to apply a set pulse to said core adapted to switch it to the other of said stable states, means for applying the timed input pulse to said core between a selected pair of said drive pulses for switching said core to said one stable state, output pulse means effectively responsive to the switching of said core by said drive pulses, storage means responsive to each effective output pulse to transmit a delayed set pulse to said core to switch it to said other stable state, whereby a number of effective output pulses is delivered by said core equal to the number of drive pulses between said initial set pulse and said timed input pulse.

4. In the circuit of claim 3, a counter responsive to each effective output pulse from said core to be stepped one digit position, whereby the complement of a digit represented by said single timed input pulse will be added into said counter by said corresponding series of pulses.

5. In a cyclicy operable device for converting a single timed input pulse representing externally stored numeric data into a corresponding series of pulses, a magnetic core having two stable states, namely, a "normal" state and an "on" state, reset means operable before the start of a cycle for slowly setting said core to said "normal" state, means for applying a periodic series of drive pulses to said core to rapidly shift it to said "normal" state, said timed input pulse being timed in accordance with the data which it represents to occur between a related pair of said drive pulses, mutually exclusive input means for applying said timed input pulse to said core, means for selecting one or the other of said input means, means operable when one of said input means is selected for setting said core to said "on" state at the beginning of a cycle, said one input means being operable in response to said timed input pulse to switch said core to said "normal" state, output pulse means effectively responsive to the switching of said core by said drive pulses, storage means responsive to each effective output pulse to transmit a delayed set pulse to said core to switch it to said "on" state, said other input means being operable in response to said timed input pulse to slowly switch said core to said "on" state, and said reset means being operable at the end of a cycle to slowly restore said core to said "normal" state, whereby when one of said input means is selected, the number of pulses emitted by said core corresponds to the complement of said stored numeric data and when the other of said input means is selected, the number of pulses emitted by said core corresponds to the stored numeric data.

6. In a multistage cyclically operable device for converting a plurality of timed input pulses, each of which pulses represents a different order of an externally stored number, into a corresponding series of pulses, a magnetic core for each of said orders, each of said cores having two stable states, namely, a "normal" state and an "on" state; reset means operable before the start of a cycle for slowly setting said cores to said "normal" state; means for applying a periodic series of drive pulses to said cores to rapidly shift them to said "normal" state; said timed input pulses being timed in accordance with the data which they represent to occur between a related pair of said drive pulses; mutually exclusive input means for applying said timed input pulses to said cores, means for selecting one or the other of said input means; means operable when one of said input means is selected for setting said core to said "on" state at the beginning of a cycle, said one input means being operable in response to each of said timed input pulses to switch the corresponding core to said "normal" state; multistage counter means having a stage connected to the output of each of said cores, means responsive to the switching of a core by a drive pulse for causing the corresponding stage of the counter means to be stepped, said counter stepping means also being responsive to an overflow from the preceding counter stage, a storage means for each core responsive to the switching of its core by a drive pulse to transmit a delayed set pulse to the core to switch it to said "on" state; said other input means being operable in response to each of said timed input pulses to slowly switch its corresponding core to said "on" state, and said reset means being operable at the end of a cycle to slowly restore each of said cores to said "normal" state; whereby, when one of said input means is selected, the number of pulses emitted by each of said cores corresponds to the complement of the corresponding order of said stored number and, when the other of said input means is selected, the number of pulses emitted by each of said cores corresponds to the corresponding order of the stored number.

References Cited in the file of this patent

UNITED STATES PATENTS

| | | |
|---|---|---|
| 2,798,169 | Eckert | July 2, 1957 |
| 2,813,207 | Bonn | Nov. 12, 1957 |
| 2,892,998 | Eckert et al. | June 30, 1959 |
| 2,901,733 | Eckert | Aug. 25, 1959 |
| 2,910,595 | Russell | Oct. 27, 1959 |
| 2,920,314 | Miehle | Jan. 5, 1960 |
| 2,930,902 | Lund | Mar. 29, 1960 |
| 2,970,297 | Kauffman | Jan. 31, 1961 |
| 2,983,905 | Buser | May 9, 1961 |

OTHER REFERENCES

Publication I: "Magnetic Core Circuits for Digital Data-Processing Systems," by Loev et al., in Proceedings of the IRE, vol. 44, issue 2, pp. 154–162, February 1956